United States Patent [19]

McLaughlin et al.

[11] Patent Number: 4,749,261
[45] Date of Patent: Jun. 7, 1988

[54] SHATTER-PROOF LIQUID CRYSTAL PANEL WITH INFRARED FILTERING PROPERTIES

[75] Inventors: Charles W. McLaughlin, Portola Valley; Paul Drzaic, Mountain View; Steven Marsland, Sunnyvale, all of Calif.

[73] Assignee: Taliq Corporation, Sunnyvale, Calif.

[21] Appl. No.: 947,793

[22] Filed: Dec. 30, 1986

Related U.S. Application Data

[63] Continuation-in-part of Ser. No. 820,533, Jan. 17, 1986 abandoned.
[51] Int. Cl.$^4$ .............................................. G02F 1/13
[52] U.S. Cl. .............................. 350/339 R; 350/334; 350/339 F; 350/347 V
[58] Field of Search ........... 350/339 R, 339 F, 347 V, 350/347 R, 334, 331 R

[56] References Cited

U.S. PATENT DOCUMENTS

| | | |
|---|---|---|
| 2,237,566 | 4/1941 | Land . |
| 3,226,903 | 1/1966 | Lillethun . |
| 3,227,593 | 1/1966 | Woelk . |
| 3,406,085 | 10/1958 | Brown et al. . |
| 3,473,863 | 10/1969 | Lewis . |
| 3,605,594 | 9/1971 | Gerritsen ............................ 95/18 |
| 3,703,329 | 11/1972 | Castellano ........................ 350/150 |
| 3,898,977 | 8/1975 | Draper ............................... 126/200 |
| 4,015,394 | 4/1977 | Kessler ............................... 52/616 |
| 4,040,047 | 8/1977 | Hareng et al. .................... 340/324 |
| 4,044,519 | 8/1977 | Morin et al. ...................... 52/304 |
| 4,123,714 | 10/1978 | Ohsawa ............................. 325/455 |
| 4,268,126 | 5/1981 | Mumford ........................ 350/331 R |
| 4,288,953 | 9/1981 | Whiteford ........................ 52/171 |
| 4,435,047 | 3/1984 | Fergason ........................... 350/334 |
| 4,456,335 | 6/1984 | Mumford ........................ 350/331 R |
| 4,556,289 | 12/1985 | Fergason ........................... 350/350 |
| 4,606,611 | 8/1986 | Fergason ........................... 350/334 |
| 4,616,903 | 10/1986 | Fergason ........................... 350/334 |

FOREIGN PATENT DOCUMENTS 1442636 7/1976 United Kingdom .

OTHER PUBLICATIONS

"Now That the Heat is Off, Liquid Crystals Can Show Their Colors Everywhere", Castellano, J. A., *Electronics*, Jul. 6, 1970.
ANSI Z26.1-1983, American National Standard for Safety Glazing Materials for Glazing Motor Vehicles Operating on Land and Highways—Safety Code.
ANSI Z26.1-1984, American National Standard For Safety Glazing Materials Used in Buildings—Safety Performance Specifications and Methods of Test.
16 C.F.R. 1201, CPSC Standard on Architectural Glazing Materials.

*Primary Examiner*—Stanley D. Miller
*Assistant Examiner*—Richard Gallivan
*Attorney, Agent, or Firm*—Flehr, Hohbach, Test, Albritton & Herbert

[57] ABSTRACT

Liquid crystal material is operable to modulate light transmitted through a panel such as a sunroof, window or partition. The panel may have safety glazing properties. The panel may also include means for reflecting infrared energy. The liquid crystal material includes operationally nematic liquid crystal having positive dielectric anisotropy and a containment medium for containing plural volumes of the liquid crystal material. The panel includes transparent surfaces with the liquid crystal material disposed therebetween and selectively operable primarily to transmit or primarily to scatter light. The liquid crystal material may alternatively include volumes of liquid crystal with a pleochroic dye in a containment medium for selectively attenuating light.

43 Claims, 2 Drawing Sheets

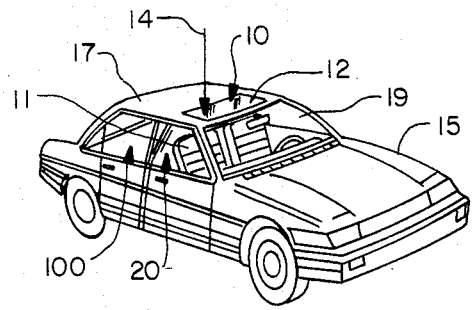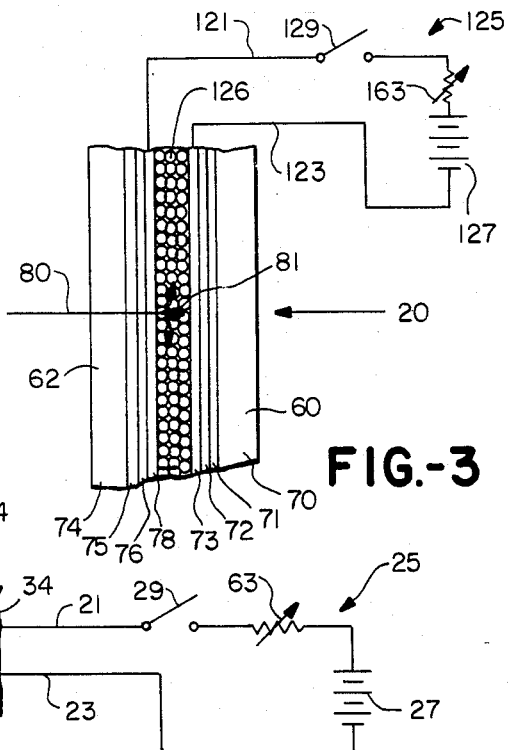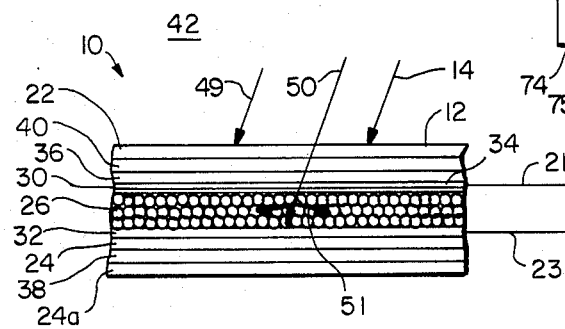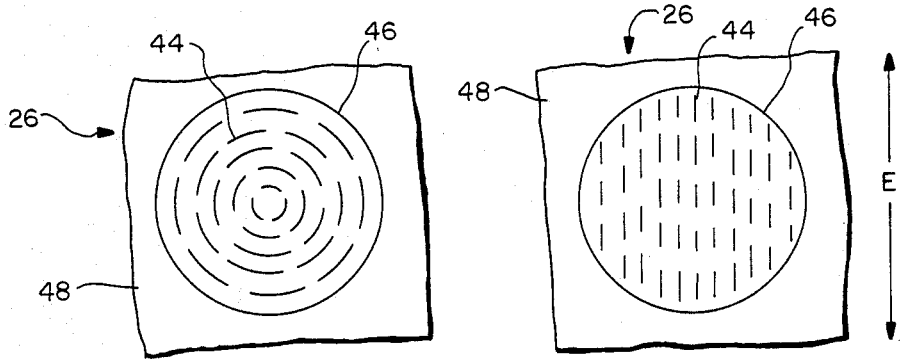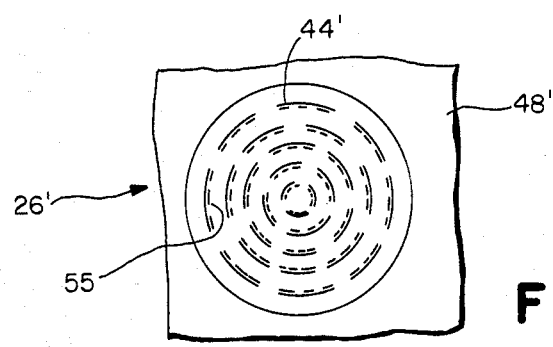

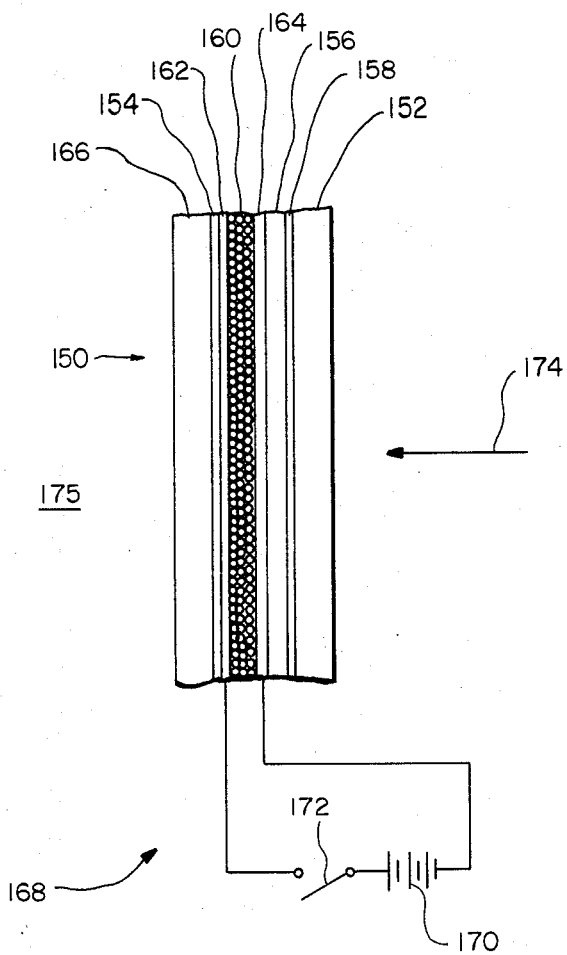
FIG.—7

SHATTER-PROOF LIQUID CRYSTAL PANEL WITH INFRARED FILTERING PROPERTIES

This application is a continuation-in-part of application Ser. No. 820,533, filed Jan. 17, 1986, now abandoned.

FIELD OF THE INVENTION

This invention relates generally to liquid crystal panels and, particularly to liquid crystal panels used for privacy, solar control, or both, which simultaneously enhance the safety characteristics of the panel by providing safety glazing properties. More particularly, this invention relates to liquid crystal panels utilized as architectural windows or in vehicles as in a sunroof, window or interior partition construction.

CROSS REFERENCE TO RELATED PATENT AND APPLICATIONS

Reference is made to the following co-pending patent applications, the entire disclosures of which hereby are incorporated by reference:

U.S. Pat. No. 4,435,047, assigned to Manchester R&D Partnership;

U.S. patent application Ser. No. 477,138, filed Mar. 21, 1983, assigned to Manchester R&D Partnership; issued as U.S. Pat. No. 4,606,611 on Aug. 18, 1986.

U.S. patent application Ser. No. 477,242, filed Mar. 21, 1983, assigned to Manchester R&D Partnership; issued as U.S. Pat. No. 4,616,903 on Oct. 14, 1986.

U.S. patent application Ser. No. 477,078, filed Mar. 21, 1983, assigned to Manchester R&D Partnership; issued as U.S. Pat. No. 4,556,289 on Dec. 3, 1985.

U.S. patent application Ser. No. 585,883, filed Mar. 2, 1984, assigned to Manchester R&D Partnership; and U.S. patent application Ser. No. 705,209, filed Feb. 25, 1985, assigned to Taliq Corporation.

BACKGROUND

Sunroofs or canopies have been used in automobiles and in other land and marine vehicles to provide the capability to vary the visible light entering such vehicles. Land and marine vehicles as well as aircraft have also utilized interior partitions to separate, for reasons of privacy, passengers from one another or operators of such vehicles from passengers. Various types of smoked or glazed windows are used in land and marine vehicles as well as aircraft to provide privacy to the passengers or operators.

Sunroofs utilized heretofore have comprised a slidably arranged portion of a vehicle's roof that may be open or closed either manually or automatically, as desired by the vehicle operator or passenger. Other sunroof configurations, sometimes called "moonroofs", do not open and close but provide a see-through section in the roof which lets ambient light enter the interior of the vehicle.

Partitions in vehicle interiors are often found in vehicles such as limousines. They are utilized to divide the passenger compartment of such vehicles from the driver's area. They may be utilized to provide privacy for the passengers. Exterior windows providing privacy to the passengers are often found in vehicles such as limousines, vans and recreational vehicles (RVs).

Safety glazing materials, in comparison with ordinary sheet glass, plate glass or float glass, are intended to reduce the likelihood of injury or the severity of injury in the event of their breakage. Such safety glazing materials often are incorporated in land or marine vehicles or aircraft where there is elevated exposure to impact or breakage. Such materials may be used in sunroofs, vehicle partitions and privacy windows. One safety glazing material may be superior for one type of hazard, whereas another may be superior against another type. Since accident conditions are not standardized, no one type of safety glazing material can be shown to possess the maximum degree of safety under all conditions, against all conceivable hazards.

Glass and films with selective light transmission properties have heretofore been used to reduce or eliminate glare, hot spots and/or thermal load on buildings or vehicles. Generally, such materials reduce visible light transmission and preferentially reflect infrared light. In some cases, such materials simply absorb light throughout the visible and/or infrared spectrum. These materials may be built into buildings or vehicles or applied afterward on a retrofit basis. In many cases where glass is used in buildings as well as in vehicles, safety glazing properties, as discussed above, are required.

There are three aspects of discomfort which these materials are designed to reduce. The first is glare, or high brightness in the visible spectrum, generally directly from the sun or sun reflection. The second is hot spots where the sun rays fall on a portion of the vehicle or building and heated far above the ambient air temperature, or where the sun's rays directly heat people. The third is general heat load, caused by sunlight, both direct and reradiated from outside the building or vehicle, which increases air temperature in the building or vehicle.

Most materials which reduce discomfort are passive and therefore have undesirable features. While they reduce glare, hot spots and thermal load, they do so at all times whether such reduction is desired or not. In many cases such as at night, or cloudy days, in morning or evening, there is no need for glare, hot spot or thermal load reduction, yet passive materials continue to reduce visibility at these times. Further, the sun's thermal heating can reduce energy use in winter, but passive materials cut the beneficial effect of the sun's heating in winter.

For these reasons a practical variable light transmission material has been sought. Such a material would reduce glare, hot spots and/or thermal load on bright summer days, but would switch to a high visibility high transmission window at all other times. Such a material would save energy and eliminate the space, weight and maintenance required for drapes.

BRIEF SUMMARY OF INVENTION

According to the present invention, first and second transparent surfaces through which visible light incident thereon may be transmitted are provided. A liquid crystal means is located between the transparent surfaces for modulating incident light.

One or more of the transparent surfaces and an adhesive, if required, providing bonding between transparent surfaces, give safety glazing characteristics to the entire construction, where individual components may not have such safety glazing characteristics. These safety glazing characteristics may be anti-lacerating, anti-fragmentary, or both, depending on the position of plastic transparent surfaces within the construction.

The structure may also include means for preferentially reflecting infrared energy. This feature is particularly advantageous if the structure is utilized as a sunroof or architectural window.

The liquid crystal means preferably is of the type disclosed in one or more of the aforementioned patent and applications. Briefly, such liquid crystal means is composed of (a) liquid crystal, preferably nematic or operationally nematic liquid crystal having positive dielectric anisotropy with certain index of refraction characteristics, in volumes formed by and/or bounded by (b) a containment medium. In one embodiment the liquid crystal has optical anisotropy having birefringence, i.e., the ordinary and extraordinary indices of refraction scattering thereof are noticeably, actually and functionally different; one index of refraction preferably is matched to that of the containment medium to minimize refraction of light at the interface thereof and the other is different from that of the containment medium to cause refraction and, thus, scattering of light incident thereon. In a second embodiment the liquid crystal has relatively low birefringence absorption and the index of refraction of the liquid crystal is relatively closely matched to that of the containment medium to minimize refraction and scattering at the interface thereof; however, pleochroic dye in the liquid crystal material provides controlled attenuation of light by absorption of light as a function of a prescribed input to the liquid crystal material. Both embodiments modulate incident light.

A preferred input to the liquid crystal material is an electric field. In the absence of such input the liquid crystal structure is distorted by surfaces of the containment medium, such as the surfaces bounding the volumes of liquid crystal in the containment medium. However, in response to an electric field the liquid crystal structure will align or at least tend to align with respect to such field, the liquid crystal structure tending to assume a generally parallel alignment—the extent of such alignment being a function of the magnitude of the field. The liquid crystal is reversible in that upon removal of the field the liquid crystal structure reverts to the distorted alignment under influence of the mentioned surface.

With the foregoing and following detailed description in mind, a primary object is to provide a liquid crystal panel that can be utilized as an architectural window, building skylight, vehicle sunroof, canopy, privacy glass, or vehicle or building interior partition. Other objects include the use of liquid crystal material that is operable to determine the proportion of incident light, i.e., light which is incident on the panel, that passes through the panel. These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail certain illustrative embodiments of the invention, these being indicative, however, of but several of the various ways in which the principles of the invention may be suitably employed.

BRIEF DESCRIPTION OF THE DRAWINGS

FIG. 1 is a schematic view of a vehicle including liquid crystal panels utilized as a sunroof, window and interior partition in accordance with the present invention;

FIG. 2 is a schematic, partial sectional view of the liquid crystal panel sunroof or window of FIG. 1;

FIG. 3 is a schematic partial sectional view of the liquid crystal panel interior partition of FIG. 1;

FIGS. 4 and 5 are schematic illustrations of a liquid crystal material used in the invention including a volume of liquid crystal in a containment medium with the liquid crystal structure in distorted and parallel alignment, respectively;

FIG. 6 is a schematic illustration of a liquid crystal material used in the invention including a volume of liquid crystal with pleochroic dye in a containment medium with the liquid crystal structure in distorted alignment; and FIG. 7 is a schematic, partial sectional view of a liquid crystal panel utilized as an architectural window or interior building partition.

DESCRIPTION OF THE PREFERRED EMBODIMENTS

Referring now in detail to the drawings, wherein like reference numerals designate like parts in the several figures, and initially to FIG. 1, a liquid crystal sunroof panel 10, a liquid crystal window 100, and a liquid crystal interior partition 20, in accordance with the present invention, in a vehicle 15 are shown.

Window 100 divides the passenger compartment 11 from the exterior of the vehicle. The window functions as an energy control element that, as discussed below, may maximize infrared light reflectivity, visible light transmissivity, and light scattering. The window 100 reduces both glare and heat incident upon passengers in the vehicle. The window also provides privacy for the passengers.

The sunroof is located in the vehicle's roof 17. It includes a face 12 onto which incident light 14 may impinge. The sunroof 10 functions as an energy control element that, as discussed below, may maximize infrared light reflectivity and visible light transmissivity. The sunroof 10 reduces both glare and heat in the vehicle's interior.

The interior partition 20 divides the passenger compartment 11 of the vehicle from the driver's area 19. The partition is designed to provide privacy for the passengers in vehicle 15.

In the embodiment of liquid crystal sunroof 10 illustrated in detail in FIG. 2, the sunroof includes two transparent surfaces 22, 24 and liquid crystal material 26 therebetween. The transparent surfaces 22, 24 allow visible light 14 incident thereon to pass therethrough. Transparent surface 22 may be composed of a material that provides maximum visible light transmission or may have selective light transmission, for example, of colors or ultraviolet or infrared. Transparent surface 24 is preferably composed of a material that provides maximum visible light transmission.

Preferably, the outermost surfaces have anti-abrasive characteristics that make them scratch resistant. Glass, such as a tempered glass, may be utilized for surface 22, while the interior surface 24 may comprise a flexible plastic to be used as a substrate for electrode 32. Surface 24 may be formed of materials such as polyester or polyethersulfone protected with a scratch-resistant coating 24a such as polyurethane or a silica-based coating. Alternatively, interior surface 24 and coating 24a may be combined as a flexible, scratch-resistant plastic, such as polyimide, which can have an electrode applied thereto. Another alternative is for surface 24 and coating 24a to comprise a rigid, abrasion-resistant material, such as glass.

The liquid crystal layer 26, combined with the plastic layer 24, and any scratch-resistant coating included on layer 24 act as a safety material to decrease the likelihood of personal injury due to an impact on the liquid crystal panel. Thus, the sunroof or window will crack or break under sufficient impact, but the pieces of glass will tend to adhere to the plastic material including directly adhering to the liquid crystal layer itself. Such a sunroof or window will offer protection from broken glass by the plastic material, including the liquid crystal layer.

The liquid crystal material therefore functions not only as an electro-optical device to modulate light but also acts as a bonding agent that produces a safety glazing effect that reduces the likelihood of injury to persons in the vehicle due to an impact on the panel. This effect is most pronounced when surfaces 22, 24, including any electrodes thereon, and the liquid crystal material 26 are juxtaposed.

The optical characteristics of the liquid crystal material 26 according to the invention are a function of whether or not a prescribed input is applied to the liquid crystal material. And in the case of the liquid crystal material 26' (see FIG. 6), in particular, optical absorption characteristics are a function of the magnitude of the prescribed input. An example of a prescribed input would be an electric field.

A schematic representation of a circuit 25 for selectively applying or not an electric field to the liquid crystal material 26 is illustrated in FIG. 2. Such circuit 25 includes an electric power supply 27, such as a battery, indeed possibly the battery or other electrical supply of vehicle 15, and a switch 29. The electric power supply may alternatively be a source of alternating current. The circuit 25 is connected by electrical leads 21, 23 to electrodes 30, 32 positioned on opposite sides or surfaces of the liquid crystal material 26. Operationally, with the switch 29 open, no electric field is applied to the liquid crystal material, which then is in a so-called field-off or de-energized condition or mode. With the switch 29 closed, an electric field is applied across the liquid crystal material, which then goes into a so-called field-on condition or mode. The light transmissive characteristics of the sunroof 10 or window 100 will depend on the field-on or field-off condition of the liquid crystal material 26, as described in further detail below.

The switch 29 may be a manually operated switch. However, an advantage of the liquid crystal sunroof of the invention is that the circuit 25 could include automatically responsive components. For example, the switch 29 could be one that is responsive automatically to a prescribed input thereto without requiring manual operation; such as exemplary switch 29 may be a photosensitive device or combination of parts or devices that can respond to intensity, existence, etc. of light incident on the sunroof, ambient light conditions, etc. Field-off operation of the liquid crystal results in a scattering and reduction in visible light transmitted through sunroof 10, or window 100, as is described further below.

The circuit 25 further may include a variable element 63, such as a variable resistor or potentiometer, or a circuit for varying the magnitude of electric field applied by the electrodes 30, 32 to the liquid crystal material 26. Such variable element 63 may be manually adjusted, say by the vehicle operator, to adjust the amount of visible light, i.e., the proportion of the incident light 14, that is transmitted through the sunroof 10 or window 100 to the vehicle interior to provide a varying glare and light reduction/adjustment capability for the sunroof.

The sunroof 10 or window 100 may include a support of glass, plastic, or even of metal or other material, as may be desired, that functions as frame (not illustrated) and provides support for the several parts of the sunroof or window.

The electrode 30 may be of various materials, such as chrome, indium oxide, tin oxide, silver, stainless steel, indium tin oxide, and so on, capable of receiving an electrical input from the conductor 21 and of cooperating with the electrode 32 to apply an electric field to the liquid crystal material 26. Similarly, the electrode 32 may be of chrome, indium oxide, tin oxide, gold, silver, indium tin oxide, etc. for such electrical purpose. Such electrodes preferably are at opposite sides or surfaces of the liquid crystal material 26 and extend over, across and parallel to such respective sides or surfaces. Electrodes 30, 32 preferably comprise a conductive coating that is transparent to visible light, although electrodes which provide preferential light transmission characteristics, such as color tint or ultraviolet or infrared filter, may be used. The electrode coatings should provide maximum transmissivity of visible light and have a resistivity of less than 1,000 ohms per square.

The embodiment of the invention, as it is illustrated in FIG. 2, may include an infrared light reflective material 34. The electrode 30 and an infrared reflective material 34 may be the same part and indeed may take the form of a stainless steel or tin oxide, optically transparent, infrared reflective and electrically conductive coating on layer 26. In such case, the material 34 preferentially reflects infrared light while allowing visible radiation to pass.

Material 34 may also uniformly reflect visible and infrared light. Reducing the transmission of infrared energy through the sunroof 10 is desirable as it will make the vehicle interior more hospitable to its occupants by decreasing the heat transmitted into and thus the temperature of the vehicle interior.

If desired, the electrode 30 and the infrared reflective material 34 may be different materials and/or constitute different layers of the sunroof or window. In this configuration, the electrode 30 may be optically transparent or at least substantially so to avoid attenuating light as it is transmitted therethrough as incident beams.

Alternatively, the outer surface 22 may comprise a glass that reflects infrared energy. Such a glass may maximize visible light transmission. A tempered glass composition including a low E coating to reflect infrared energy may form surface 22. This composition may also have a tinted layer.

The liquid crystal material 26 may be coated and dried onto a flexible plastic, scratch-resistant substrate having a conductive coating. The flexible substrate could, e.g., form the inner surface 24 and the conductive coating form an electrode. A protective, removable cover slip may be applied to the dried liquid crystal material, and the resultant sandwich sold as a roll stock to sunroof or vehicle manufacturers who would remove the cover slip prior to use in constructing a sunroof or window.

The sunroof 10 or window 100 may further include a layer 36 of ultraviolet light absorbing material. Layer 36 may be placed at any level above the liquid crystal material 26. Layer 36 may be interposed between electrode 30 and liquid crystal material 26 if it still were possible to provide an adequate electric field to the liquid crystal material when desired. As illustrated in FIG. 2, it may also be located between electrode 30 and outer surface 22. Layer 36 may comprise such ultraviolet light absorbing materials as Nitto 70 Denko UV Filter UVF-DOZ-E, or plexiglass UF-3 from Rohm and Haas, Philadelphia, Pa. or Polyvinyl Butyral (PVB) from Dupont, Wilmington, Del. The absorption of ultraviolet light prevents deterioration, i.e., fading, of the colors in the vehicle's interior as well as the discoloration, i.e., yellowing of the liquid crystal material.

The absorption of substantially all of the ultraviolet light impinging on sunroof 10 or window 100 may also be achieved by imbibing the liquid crystal material 26 with an ultraviolet light absorbing material. Such additives that may be used include 2 (2'-Hydroxy-5'-methylphenyl) benzotriazole (Tinuvin P by Ceba-Geigy, Geneva, Switzerland) or Nickel bis [O-ethyl (3,5 di-t-butyl-4-hydroxbenzyl)] phosphonate (Irgastab 2002 by Ceba-Geigy).

The sunroof 10 or window 100 may be further improved by utilizing a special light polarizer. The polarizer should have its axis of absorption perpendicular to the face of the polarizer. The polarizer 38 is provided to reduce the haze otherwise present when the liquid crystal material is in the field-on state. The polarizer 38 may be interposed between electrode 32 and inner surface 24. Alternatively, if a protective coating 24a is utilized, polarizer 38, as shown, may be located between coating 24a and surface 24.

The haze perceived by an observer is of preferentially one polarization. This polarization occurs when the light illuminating the liquid crystal material 26, or when the observer viewing the liquid crystal material is at an angle other than normal to the surface of the layer of liquid crystal material. Under such conditions, one polarization of light is not scattered. The polarizer 38 will preferentially absorb the polarization incorporating the scattered light, resulting in a less hazy, and thus clearer, liquid crystal material in the field-on state.

Liquid crystal material that has mixed with the liquid crystal a pleochroic dye (see FIG. 6) may achieve the same effect without using a polarizer. By selecting the proper percentage of pleochroic dye for the liquid crystal, the above-discussed haze effect can be reduced.

A depolarizer 40 may also be included in the sunroof structure. The depolarizer 40 is provided to increase the brightness of an image observed from the vehicle's interior through the sunroof or window. Depolarizer 40 may be a separate layer or it and outer surface 22 may comprise one element. Alternatively, the depolarizer 40, the ultraviolet layer 36 and the electrode 30 may be combined as one element. The depolarizer is preferably interposed between the liquid crystal material 26 and light incident on the sunroof 10 from the exterior of the vehicle, which is represented by light beam 14.

Depolarizer 40 may be a birefringent material, e.g., a stretched plastic such as a Mylar ® or polyethylene sheet, which will change the polarization of light passing therethrough. The use of depolarizer 40 is desirable because the polarization of light that is not scattered by the liquid crystal material in the field-on state is preferentially reflected at the interface between the outer surface 22 and the ambient air 42.

It depolarizer 40 is not utilized, the special polarizer 38 will still work but the brightness of the image transmitted to an observer within the vehicle by the non-absorbed polarization will be reduced, since a substantial portion of the light has been reflected before impinging upon the liquid crystal material 26. The depolarizer 40 effects light that is directed toward the liquid crystal material 26 and changes the polarization of some fraction of that light (before it reaches the liquid crystal material) into the polarization that is not scattered by the liquid crystal material in the field-on state. Thus, the brightness of the observed image will be increased.

The liquid crystal material 26 preferably is of the type disclosed in U.S. Pat. No. 4,435,047 and in several of the above-mentioned patent applications. The liquid crystal material should be selected to maximize the scattering of light in the field-off state so that glare, hot spots and heat load in the vehicle interior are reduced. Generally, the transmissivity of visible light when the liquid crystal material is in the field-on state should be in excess of 70%, and desired field-off state transmissivity will vary with the nature of layer 22 and the off state scattering, absorption and reflection properties of layer 26. Overall light transmission through the sunroof or window of 40% or less in the field-off state is preferable where heat load is important.

In particular, as is represented schematically in FIG. 4, such liquid crystal material 26 preferably is formed of operationally nematic liquid crystal 44 in a plurality of volumes 46 formed in or defined by a containment medium 48. The liquid crystal 44 preferably is optically transparent, and the containment medium preferably also is optically transparent. In the embodiment illustrated in FIGS. 4 and 5, the liquid crystal material 26 does not include any pleochroic dye. However, the containment medium 48 does have an index of refraction and the liquid crystal material is birefringent, being optically anisotropic and having positive dislectric anisotropy during operation.

Preferably the ordinary index of refraction of the liquid crystal 44 in the presence of an electric field, i.e., in field-on condition, the field being of adequate strength, matches the index of refraction of the containment medium. FIG. 5 illustrates the alignment of the liquid crystal 44 with respect to an applied electric field E. However, in the absence of an electric field the containment medium, more specifically, the surface(s) thereof, e.g., the surfaces of the containment medium walls bounding each of the volumes 46 of liquid crystal 44, tend to distort the natural liquid crystal structure to present to a great extent at the interfaces of the liquid crystal and surfaces the extraordinary index of refraction characteristic of the liquid crystal; and such extraordinary index of refraction is different from the index of refraction of the containment medium. Therefore, when in such distorted alignment condition, sometimes referred to nematic curvilinearly aligned phase ("NCAP") of the liquid crystal, there is a difference in the indices of refraction at the interface between the liquid crystal and containment medium, which causes refraction and, thus, scattering of light incident thereon. Furthermore, due to the varying alignment of liquid crystal molecules within the capsules, the index of refraction varies within the capsules, causing further scattering of incident light. FIG. 4 illustrates such distorted alignment of the liquid crystal structure in the absence of an electric field.

As is disclosed in the above-referenced patent and applications, the volumes 46 of liquid crystal material may be separate from one another, may be interconnected to one or more volumes, or may include both separate and interconnected volumes. The liquid crystal material 26 may be prepared in the form of an emulsion of liquid crystal and containment medium which is subsequently dried or cured. Alternatively, the liquid crystal material 26 may take the form of a plurality of individually formed capsules of liquid crystal in a containment medium. The liquid crystal material may be considered encapsulated liquid crystal material. In any event, regardless of what the liquid crystal material is called or how it is made, it should provide an operative function such that the surface of containment medium confronting liquid crystal will distort the natural structure of the liquid crystal absent a prescribed input. Exemplary materials of which the liquid crystal material may be composed and methods for forming such liquid crystal material, and particularly the volumes of liquid crystal and containment medium, are disclosed in the aforementioned patent and applications.

One such liquid crystal is nematic liquid crystal, and two examples of containment media are polyvinyl alcohol or latex. NCAP liquid crystal material in a latex medium is described in the aforementioned application Ser. No. 705,209. Also, although the distorted alignment of liquid crystal structure illustrated in FIG. 4 is of the type wherein the liquid crystal structure generally is parallel to the wall of the containment medium bounding the given volume of liquid crystal, such distortion may result in the liquid crystal, structure being generally normal to the volume wall, at least in proximity to such wall.

In field-on operation, the switch 29 has been closed so that an electric field is being applied to the liquid crystal material 26, which aligns with respect to the electric field (see FIG. 5). The liquid crystal structure is considered to assume a generally parallel alignment in such field-on condition. Since the ordinary index of refraction of the liquid crystal 44 in field-on condition is matched to that of the containment medium 48, the liquid crystal material 26 becomes essentially optically transparent and light incident thereon is not refracted at interfaces between liquid crystal and containment medium. During such field-on operation of sunroof 10 or window 100, incident visible light represented by light ray 49 is transmitted through the varying layers of the sunroof or window to the vehicle interior. Preferably, as discussed heretofore, ultraviolet light is absorbed and infrared light reflected.

Field-off operation of the sunroof 10 occurs when the switch 29 is open, and, therefore, no electric field is applied to the liquid crystal material 26 (see FIG. 4). Accordingly, light which is incident on the liquid crystal material 26 is refracted and is scattered. This would include that light transmitted through the sunroof from outside the vehicle as well as light that is transmitted toward the sunroof from inside the vehicle. Such scattering is effected because the extraordinary index of refraction of the liquid crystal 44 is different from the index of refraction of the containment medium 48.

An incident light ray 50, which is scattered in the liquid crystal material 26, is representatively illustrated in FIG. 2. Such scattered light, which is generally represented at 51, creates a generally uniform field of illumination somewhat like the appearance of a relatively dim diffuse light transmitted through translucent diffusing material. Since a portion of the overall light incident on the sunroof 10 during such field-off operation is scattered, indeed is scattered in directions not toward the eye of the observer, the sunroof 10 or window 100 effectively provides an attenuated light output with respect to the vehicle interior, i.e., of reduced glare and intensity. Furthermore, since light which succeeds in entering the vehicle is scattered in directions away from the driver and passenger, the sunroof 10 or window 100 effectively diffuses and attenuates light incident on the driver and passenger, reducing heat and glare incident on the driver and passenger. Therefore, since light is modulated in this manner, the range of temperatures to which the vehicle occupants are subjected is extremely narrowed.

Thus, it will be appreciated that the sunroof 10 or window 100 according to the present invention can be operated in field-off condition to reduce the glare, heat and light or provide privacy that would otherwise be observable to the vehicle's occupants. On the other hand, when there is no need to reduce glare or heat, or provide privacy, the sunroof 10 or window 100 may be operated in the non-scattering or field-on mode of the liquid crystal material 26 so that substantially all light incident on the sunroof, other than preferably ultraviolet and infrared light, will be transmitted to the vehicle interior. Thus, the surroundings are observable by the occupants of the vehicle through the sunroof 10 or window 100. Also, occupants of the vehicle are observable from outside the vehicle through the sunroof 10 or window 100.

The degree of light scattering may also be varied between the field-off and field-on states by utilizing the variable element 63 to adjust the magnitude of the electric field applied to the liquid crystal material.

Referring now to FIG. 6, the sunroof 10 may include liquid crystal material 26' that has mixed with the liquid crystal 44' a pleochroic dye 55. The liquid crystal 44' preferably is operationally nematic and has positive dielectric anisotropy. However, unlike the liquid crystal 44, the liquid crystal 44' has low birefringence characteristics. Moreover, the liquid crystal 44' has an index of refraction that is matched closely, if not identically, to that of the containment medium 48' so that whether in field-on or field-off condition there will be no or only a minimum of light refraction at the interfaces between the liquid crystal 44' and containment medium 48'. Thus, operation of the liquid crystal material 26' is analogous to operation of the liquid crystal material disclosed in the above-mentioned patent application Ser. No. 477,078.

The pleochroic dye in the liquid crystal 44' will absorb some of the light transmitted therethrough, and the degree of such absorption is a function of whether or not an electric field is applied to the liquid crystal material and of the magnitude of such field. Preferably, such absorption in field-on condition of the liquid crystal should be zero or as close to zero as possible to maximize intensity of transmitted light in the field-on state.

Specifically, the dye alignment follows the alignment of the liquid crystal 44', as is illustrated schematically in FIG. 6, for example, and is explained in further detail in the above-mentioned patent and application Ser. No. 477,078. Therefore, when the liquid crystal structure is in distorted alignment, the dye will provide a relatively substantial amount of light absorption. However, when the liquid crystal 44' is in parallel alignment, e.g., like that liquid crystal shown in FIG. 5, light absorption by the dye will be minimized. As the magnitude of electric field is increased or decreased, the amount of distortion of the liquid crystal material will vary, and the amount of absorption by the dye also will correspondingly vary.

The liquid crystal material 26' through light absorption may be utilized to alternate the amount of infrared energy entering the vehicle through the sunroof. Also, the liquid crystal material 26' can be utilized to control glare by means of its scattering properties. Further, proper selection of the percentage of pleochroic dye in the liquid crystal material will effectively reduce the haze of the liquid crystal material without utilizing the special polarizer discussed above.

When the switch 29 is open, the liquid crystal material 26' is in distorted alignment, field-off condition and the sunroof will reduce the glare and light entering the vehicle interior. In the field-on condition of the liquid crystal material 26', the sunroof 10 will provide maximum light transmission.

The liquid crystal interior partition 20 is illustrated in greater detail in FIG. 3. Such a partition may function as a barrier providing privacy between the vehicle's operator and its passengers. A limousine divider is an example of such a partition. The partition may also be operable to reduce glare or to provide shade. The construction of such a partition may be somewhat similar to the sunroof 10 described heretofore.

The partition 20 includes first and second transparent surfaces 60, 62. The transparent surfaces 60, 62 permit the transmission of visible light through the partition 20. Like the transparent surfaces of the sunroof 10, transparent surfaces 60, 62 are fabricated from a material that provides maximum visible light transmission. These surfaces may have anti-abrasive characteristics that make them scratch resistant. A tempered glass may be used to form surfaces 60, 62. The glass may also be tinted.

Surfaces 60, 62 may also possess anti-lacerative or shatter-resistant properties. In particular, surface 60 may comprise a glass sheet 70 which is adhered to a plastic substrate 72 by means of an optically transparent adhesive 71. The plastic substrate 72 may comprise such materials as polyester or polyethersulfone. The adhesive may be an ultraviolet-curable, transparent adhesive having sufficient bonding strength. An examples of optical adhesive 71 that is suitable for use in the construction of partition 20 is Adlam ® ultraviolet adhesive available from Adlam, S. A., Geneva, Switzerland, or PVB from Dupont.

Similarly, surface 62 may comprise a glass sheet 74 secured to a plastic substrate 76 of the type of material discussed above by means of an adhesive 75 that is substantially transparent to visible light. Such a construction would provide partition 20 with sufficient safety glazing properties such that if the transparent surfaces crack or break under sufficient impact, the resultant pieces of glass will not fly freely through the interior of the vehicle but rather will tend to adhere to one or the other of the plastic substrates 72, 76. The thickness of the central layers 71, 72, 75, 76, and 126 combined with the existence of multiple layers of differing materials, including the liquid crystal layer, increases significantly the force necessary to penetrate the panel, making it difficult to break.

Partition 20 further includes electrodes 73, 78 preferably disposed at opposite sides or surfaces of the liquid crystal material 126 to extend over, across and parallel to the respective sides or surfaces of the liquid crystal material. As in the case of the sunroof or window, electrodes 73, 78 may be of various materials, such as indium oxide, tin oxide or indium tin oxide. Preferably, their resistance is between 50 and 1,000 ohms per square. A Mylar ® film with a precoated ITO electrode, known as Intrex, may be purchased from Sierracin of Sylmar, Calif. and may be utilized in the construction of partition 20, as plastic substrates 72, 76 with precoated electrodes 73, 78.

A schematic representation of a circuit 125 for selectively applying or not an electric field to the liquid crystal material 126 is also shown in FIG. 3. The circuit includes an electric power source 127, such as a car battery, a switch 129, electrical leads 121, 123 for connecting the power source to electrodes 73, 78. With the switch 129 open, no electric field is applied to the liquid crystal material 126, which is then, as discussed heretofore, in the field-off or de-energized condition or mode. With the switch 129 closed, an electric field is applied across the liquid crystal material, which then goes into the field-on condition or mode.

The light transmissive characteristics of the partition 20 will depend on whether the liquid crystal material 126 is in the field-on or field-off mode. Particularly, if it is desired to block the transmission of light through partition 20, thereby providing a privacy barrier, switch 129 would be open and light incident on the partition, such as that represented by light beam 80, is refracted and scattered as shown at 81. To eliminate the privacy barrier effect, only requires that switch 129 be closed so that an electric field is applied across the liquid crystal material 126 to permit the transmission of light therethrough.

Circuit 125 may, alternatively, include a variable element 163, such as a variable resistor, for varying the magnitude of the electric field applied across the liquid crystal material, thus varying the extent to which light is transmitted through partition 20.

As an alternative embodiment, the partition 20 may include a liquid crystal material that has mixed with the liquid crystal a pleochroic dye. Such liquid crystal and liquid crystal material would have the characteristics discussed heretofore with respect to FIG. 6. More specifically, a Sudan black B pleochroic dye may be dissolved in the liquid crystal. Enough dye would be dissolved in the liquid crystal such that when an electric field is applied to the liquid crystal material, the material will change from black to nearly clear-transparent. Thus, in the field-off state, a black barrier will be provided by the partition 20.

An edge seal of approximately ⅛" may be formed around the perimeter of the partition 20. The liquid crystal material 126 would not be located in the area of the edge seal. The edge seal may simply comprise an adhesive interface between the glass surfaces 70, 74. The edge seal provides a seal against moisture as well as contaminants and serves to prevent the liquid crystal material from deteriorating.

In view of the foregoing, it will be appreciated that the present invention provides for adjustment of the amount of or proportion of incident light modulated by a sunroof, window or a partition. The present invention may also be utilized in the construction of other components such as a sun visor for a vehicle.

A liquid crystal panel or partition 150 utilized in a building structure is illustrated in FIG. 7. Such a panel may function, e.g., as an architectural window, skylight, or interior building partition. The panel may be utilized to scatter light, to provide privacy by diffusing images or to eliminate glare and hot spots.

The partition 150 includes first and second transparent surfaces 152, 154. The transparent surfaces permit the transmission of visible light through the partition. Like the transparent surfaces of partition 20, transparent surfaces 152, 154 may be fabricated from a material that provides maximum visible light transmission. These surfaces may also have anti-abrasive characteristics that make them scratch-resistant. A tempered glass may be used to form surfaces 152, 154. One or both surfaces may be tinted so that absorption is a function of the path of the light passing through the panel.

Partition 150 may possess safety glazing properties. Accordingly, the outside glass surface 152 may be adhered to a plastic substrate 156 by means of an optically transparent adhesive 158. This transparent adhesive may have ultraviolet light-blocking properties, to protect the liquid crystal layer 160 and vehicle or building interior from yellowing and fading. The plastic substrate 156 is also optically transparent and may comprise such materials as polyester or polyethersulfone. An example of an optical adhesive is Adlam ® or PVB. The partition, of course, may be constructed without safety glazing properties by eliminating substrate 156.

Partition 150 further includes a layer of liquid crystal material 160 of the type discussed heretofore. Additionally, partition 150 includes electrodes 162, 164 preferably disposed at opposite sides of surfaces of the liquid crystal material 160 to extend over, across and parallel to the respective sides or surfaces of the liquid crystal material. As in the case of the vehicle sunroof, window or interior partition, electrodes 162, 164 may be formed, e.g., from various materials such as indium oxide, tin oxide, or indium tin oxide.

Partition 150 may further incorporate a layer 166. Material or layer 166 may reflect infrared and/or visible light, where reflection significantly varies as a function of the angle of incident light. Such an effect can be achieved with a material with a high index of refraction, where transition of light from high index to low index (air) will cause total reflection at a relatively low divergence angle from normal. Such a high index material could be indium tin oxide or tin oxide. Layer 166 may be located as a layer on the surface of the panel which faces the interior 175 of the building or vehicle.

The electrode 162 and the light reflective material 166 may also be the same part and may take the form of a stainless steel, tin oxide or gold, optically transparent, infrared reflective, and electrically conductive coating on layer 160. The layer 166 may preferentially reflects infrared light while allowing visible radiation to pass. Reducing the transmission of infrared energy through the partition 150 will reduce the general heat load as well as hot spots.

As discussed heretofore, an electrical circuit 168 for selectively applying or not an electric field to the liquid crystal material 160 may be provided as shown in FIG. 7. The circuit includes an electric power source 170, a switch 172, and appropriate electrical leads for connecting the power source to electrodes 162, 164. In the absence of an electric field, the liquid crystal material is in the field-off or de-energized condition or mode. When the switch is closed, an electric field is applied across the liquid crystal material, which then goes into the field on condition or mode.

When no field is applied, switch 172 open, light incident on partition 150, such as that representing by light beam 174, is refracted and back scattered (diffusely reflected). Back scattering refers to scattering incident light back toward its source. Scattering light in this manner provides energy control for both visible and infrared energy. Closing switch 172 and thereby applying an electric field across the liquid crystal material, permits the transmission of light through panel 150 and dramatically reduces back scattering.

Circuit 168 may, alternatively, also include a variable element (not shown) for varying the magnitude of the electric field across the liquid crystal material and thus varying the modulation of light.

As discussed, scattering of light creates privacy, and eliminates glare and hot spots. Scattering also serves to reduce general heat load. General heat load can be reduced by scattering in three ways: (1) When light is scattered back towards its source (much like reflection except that no coherent images are created by back scattering); (2) When scattered light passes through another material which reduces heat load by absorbing scattered light more (due to longer path length) or by reflecting scattered light more (due to more light striking the material at angles above the critical angle of reflection); and (3) When scattered light exits another window rather than striking the building interior or the vehicle interior. This last effect is particularly noticeable when a vehicle sunroof scatters incoming light such that a portion exists the side glass and windshield.

When a high degree of scattering exists, a low level of thermal load on a building or vehicle can be achieved. When a field is applied to the liquid crystal layer, scattering is dramatically reduced and thermal load on a building or vehicle can be increased and a high degree of transparency achieved.

As an alternative embodiment, the liquid crystal material 160 of the partition may include an infrared dye that absorbs infrared energy, thereby providing additional control over the amount of infrared energy transmitted to the interior of a vehicle or building. Such an infrared dye would vary infrared absorption as a function of field.

Although certain specific embodiments of the invention have been described herein in detail, the invention is not to be limited to only such embodiments, but rather only by the appended claims.

What is claimed is:

1. A liquid crystal panel, comprising:
   first and second transparent surfaces through which visible light incident thereon may be transmitted;
   liquid crystal means located between said transparent surfaces for determining the amount of light transmitted through said panel;
   said liquid crystal means including operationally nematic liquid crystal having positive dielectric anisotropy and a containment medium means for containing plural volumes of said liquid crystal; and
   means for reducing the amount of infrared energy transmitted through said panel.

2. The panel of claim 1 further including means for absorbing ultraviolet radiation incident thereon.

3. The panel of claim 1 further including a polarizer for absorbing the polarization incorporating the light scattered by said liquid crystal means in a field-on state.

4. The panel of claim 1 further including a depolarizer for altering the polarization of light prior to incidence on said liquid crystal means.

5. The panel of claim 1 wherein said first and second transparent surfaces have anti-abrasive properties.

6. The panel of claim 1 wherein at least one of said surfaces has anti-lacerative or shatter-resistant properties.

7. A liquid crystal panel, comprising:
first and second transparent surfaces through which visible light incident thereon may be transmitted;
liquid crystal means located between said transparent surfaces and adhered to at least one of said transparent surfaces for determining the amount of light transmitted through said panel;
said liquid crystal means including operationally nematic liquid crystal having positive dielectric anisotropy and a containment medium means for containing plural volumes of said liquid crystal; and
the combination of said liquid crystal means, and said first and second transparent surfaces providing said panel with safety glazing properties.

8. The panel of claim 7 further including means for reducing the amount of infrared energy transmitted through said panel.

9. The panel of claim 7 further including a depolarizer for altering the polarization of light prior to incidence on said liquid crystal means.

10. A liquid crystal panel, comprising:
first and second transparent surfaces through which visible light incident thereon may be transmitted;
liquid crystal means located between said transparent surfaces for modulating light incident on said panel;
said liquid crystal means including operationally nematic liquid crystal having positive dielectric anisotropy and a containment medium means for containing plural volumes of said liquid crystal;
means for reducing the amount of infrared energy transmitted through said panel; and
said liquid crystal means including a plastic substrate adhered to at least one of said transparent surfaces to provide said panel with safety glazing properties.

11. The panel of claim 10 further including means for absorbing ultraviolet light incident on said panel.

12. The panel of claim 11 further including a light polarizer for absorbing the light polarization incorporating the light scattered by the liquid crystal means in a field-on state to produce a clearer panel in such state.

13. The panel of claims 11 or 12 wherein said first and second transparent surfaces include anti-abrasive properties.

14. The panel of claim 10 further including a light depolarizer for altering the polarization of light prior to incidence on said liquid crystal means to increase the brightness of an image observed through the panel.

15. The panel of claim 1 or 10 wherein said first transparent surface is an outer surface that is formed of glass that includes said infrared energy reducing means.

16. The panel of claim 15 wherein said second transparent surface is an inner surface that has anti-lacerative or shatter-resistant properties.

17. The panel of claims 1, 8 or 10 wherein said infrared energy reducing means comprises an infrared energy absorbing dye in said liquid crystal material.

18. The panel of claims 1, 8 or 10 wherein said infrared energy reducing means comprises a layer for preferentially reflecting infrared light.

19. A liquid crystal panel, comprising:
first and second transparent surfaces through which visible light incident thereon may be transmitted;
liquid crystal means located between said transparent surfaces for modulating light incident on said panel;
said liquid crystal means including operationally nematic liquid crystal having positive dielectric anisotropy and a containment medium means for containing plural volumes of said liquid crystal; and
said liquid crystal means including a plastic substrate means adhered to at least one of said transparent surfaces to provide said panel with safety glazing properties.

20. The panel of claims 7, 8, 9, or 19 wherein said first and second transparent surfaces include anti-abrasive properties.

21. The panel of claims 7, 8, 9, or 19 further including means for absorbing ultraviolet radiation incident thereon.

22. The panel of claims 7, 8, 9, or 19 further including a polarizer for absorbing the polarization incorporating the light scattered by said liquid crystal means in a field-on state.

23. The panel of claims 1, 7, 10, or 19 wherein one of said transparent surfaces comprises a flexible, scratch-resistant plastic film including an electrically-conductive, optically transparent coating and said liquid crystal means.

24. The panel of claims 1, 7, 10, or 19 wherein said containment medium means comprises surface means for distorting the natural structure of said liquid crystal absent a prescribed input.

25. The panel of claim 24 wherein said liquid crystal is birefringent and has an ordinary index of refraction in the presence of a prescribed input that is substantially matched to the index of refraction of said containment medium means to minimize refraction and scattering of light and an extraordinary index of refraction in the absence of such prescribed input that is different from the index of refraction of said containment medium means to cause refraction and scattering of light.

26. The panel of claim 24 further including input means for applying the prescribed input to said liquid crystal means.

27. The panel of claim 26 wherein said input means comprises electrode means at opposite surfaces of said liquid crystal means for applying an electric field across said liquid crystal means.

28. The panel of claim 27 further including circuit means for providing electric energy to said electrode means to effect application of an electric field to said liquid crystal means.

29. The panel of claim 28 wherein at least one of said transparent surfaces is electrically conductive and comprises at least one of said electrode means.

30. The panel of claim 24 further comprising pleochroic dye in said liquid crystal.

31. The panel of claim 30 wherein the structure of said pleochroic dye conforms to the structure of said liquid crystal, said dye being operative to absorb light when said liquid crystal structure is in distorted alignment.

32. The panel of claim 30 further including means for applying an electric field to said liquid crystal means to tend to effect generally parallel alignment of said liquid crystal structure to reduce the amount of absorption by said dye.

33. The panel of claim 32 wherein said means for applying includes plural electrodes, one on each side of said liquid crystal means.

34. The panel of claim 1, 7, 10, or 19 utilized as a divider between interior portions of a vehicle.

35. The panel of claims 1, 7, 10, or 19 utilized as a sunroof or a moonroof.

36. The panel of claims 1, 7, 10, or 19 utilized as a vehicle window.

37. The panel of claims 1, 7, 10, or 19 utilized as an architectural window.

38. The panel of claims 1, 7, 10, or 19 utilized as a skylight or an interior building partition.

39. The panel of claim 1, 7, 10, or 19 wherein at least one of said transparent surfaces is tinted.

40. The panel of claims 1, 7, 10, or 19 wherein at least one of said transparent surfaces is coated with a material with a high index of refraction.

41. The panel of claims 1, 7, 10, or 19 further including a layer for reflecting visible light.

42. The panel of claim 19 further including means for reducing the amount of infrared energy transmitted through said panel.

43. The panel of claim 19 further including a depolarizer for altering the polarization of light prior to incidence on said liquid crystal means.

* * * * *